(12) United States Patent
Swanson et al.

(10) Patent No.: US 12,228,642 B2
(45) Date of Patent: *Feb. 18, 2025

(54) CHARACTERISING WAVE PROPERTIES BASED ON MEASUREMENT DATA USING A MACHINE-LEARNING MODEL

(71) Applicant: TidalX AI Inc., San Ramon, CA (US)

(72) Inventors: Thomas Robert Swanson, Sunnyvale, CA (US); Riva Gulassa, Sunnyvale, CA (US)

(73) Assignee: TidalX AI Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,506

(22) Filed: Aug. 1, 2023

(65) Prior Publication Data

US 2024/0192363 A1  Jun. 13, 2024

Related U.S. Application Data

(63) Continuation of application No. 17/869,050, filed on Jul. 20, 2022, now Pat. No. 11,754,707.

(Continued)

(51) Int. Cl.
*G01S 15/87* (2006.01)
*G01S 15/89* (2006.01)
*G06N 20/00* (2019.01)

(52) U.S. Cl.
CPC ........ *G01S 15/872* (2013.01); *G01S 15/8952* (2013.01); *G06N 20/00* (2019.01)

(58) Field of Classification Search
CPC .... G01S 15/872; G01S 15/8952; G06N 20/00
See application file for complete search history.

(56) References Cited

U.S. PATENT DOCUMENTS 11,754,707 B2 * 9/2023 Swanson ................. B63B 79/15
                                                               367/99
2020/0107524 A1  4/2020 Messana et al.
(Continued)

FOREIGN PATENT DOCUMENTS

CN   107545250       1/2018
CN   114548553 A *   5/2022
(Continued)

OTHER PUBLICATIONS

Translation of CN-114548553 (Year: 2022).*
(Continued)

*Primary Examiner* — Daniel Pihulic
(74) *Attorney, Agent, or Firm* — Fish & Richardson P.C.

(57) ABSTRACT

Methods, systems, and apparatus, including computer programs encoded on computer storage media, for estimating wave properties of a body of water. A computer-implemented system obtains measurement data for a duration of time from an inertial measurement unit (IMU) onboard an underwater device, generates model input data based on at least the measurement data obtained at the plurality of time points, and processes the model input data to generate model output data indicating one or more wave properties using a machine-learning model. The system further determines, based on at least the one or more wave properties, whether the device is safe to be deployed.

20 Claims, 4 Drawing Sheets

Related U.S. Application Data (60) Provisional application No. 63/242,639, filed on Sep. 10, 2021.

(56) References Cited

U.S. PATENT DOCUMENTS

| | | | |
|---|---|---|---|
| 2022/0155069 A1 | 5/2022 | Previsic | |
| 2023/0078797 A1* | 3/2023 | Swanson | G06N 20/00 367/99 |
| 2024/0192363 A1* | 6/2024 | Swanson | A01K 61/95 |

FOREIGN PATENT DOCUMENTS

| | | | |
|---|---|---|---|
| WO | WO 2020/180818 | 9/2020 | |
| WO | WO 2023/039316 | 3/2023 | |
| WO | WO-2023039316 A1 * | 3/2023 | G01S 15/872 |

OTHER PUBLICATIONS

[No Author Listed], "Chapter 5 The Output: Ship Motions in Waves," United States Naval Academy Course Notes, 2019, 14 pages.

Abankwa et al., "Ship Motion Measurement Using an Inertial Measurement Unit," Faculty of Engineering and the Environment, University of Southampton, Sep. 22, 2017, 6 pages.

ardupilot.org [online], "Measuring Vibration with IMU Batch Sampler," Sep. 2019, retrieved on Dec. 27, 2022, retrieved from URL<https://ardupilot.org/dev/docs/common-imu-batchsampling.html>, 7 pages.

Huang et al., "Monitoring High-frequency Ocean signals using low-cost GNSS/IMU buoys," The International Archives of the Photogrammetry, Remote Sensing and Spatial Information Sciences, XXIII ISPRS Congress, Jul. 12-19, 2016, XLI-B8:1127-1134.

International Search Report and Written Opinion in International Appln. No. PCT/US2022/073919, dated Nov. 7, 2022, 23 pages.

Koziel, "Assessing wave conditions in a Norwegian fjord," Master's Thesis in Offshore Technology, University of Stavanger, Norway, Jul. 13, 2017, 93 pages.

wikiwaves.org [online], "Waves and the Concept of a Wave Spectrum," last edited Dec. 9, 2012, retrieved on Dec. 27, 2022, retrieved from URL<https://wikiwaves.org/Waves_and_the_Concept_of_a_Wave_Spectrum/>, 7 pages.

International Preliminary Report on Patentability in International Appln. No. PCT/US2022/073919, dated Mar. 21, 2024, 8 pages.

* cited by examiner

CHARACTERISING WAVE PROPERTIES BASED ON MEASUREMENT DATA USING A MACHINE-LEARNING MODEL

CROSS-REFERENCE TO RELATED APPLICATION

This patent application is a continuation (and claims the benefit of priority under 35 USC 120) of U.S. patent application Ser. No. 17/869,050, filed Jul. 20, 2022, which claims priority under 35 U.S.C. 119 to Provisional Application No. 63/242,639, filed Sep. 10, 2021, which is incorporated by reference.

FIELD

This specification generally relates to characterizing wave properties of a body of water based on measurement data using a machine learning model.

BACKGROUND

An underwater device, such as an underwater camera system that has been deployed in a body of water for monitoring underwater conditions, may be subject to high-intensity tidal waves. The waves may cause damages to the underwater device or severely impact its operation. Real-time information of the wave properties of the body of water is needed for determining strategies for safe operations of the underwater device. For example, wave property parameters can be used to determine whether it is safe to deploy the underwater device to a particular position of operation.

A machine learning model is a mathematical model implemented by computer algorithms that generate an output without being explicitly programmed to do so. The machine learning model can improve automatically through experience and/or by the use of training data. For example, one or more model parameters of the machine learning model can be updated using the training data in a training process.

SUMMARY

This specification describes systems, methods, devices, and other techniques related to estimating wave properties by using a machine learning model to process measurement data obtained by an underwater inertial-measurement unit (IMU) device, such as an IMU device that exists as part of legacy device that already exists in the environment and that is used for other purposes.

In one aspect of the specification, a method is provided for estimating wave properties of a body of water. The method is implemented by a system that includes one or more processors. The system obtains measurement data for a duration of time from an inertial measurement unit (IMU) onboard an underwater device, generates model input data based on at least the measurement data obtained at the plurality of time points, and processes the model input data to generate model output data indicating one or more wave properties using a machine-learning model. The system further determines, based on at least the one or more wave properties, whether the device is safe to be deployed.

In some implementations, the underwater device is a sensor system configured in an underwater cage structure to collect data of an aquatic cargo. The measurement data includes one or more of: linear acceleration data, angular rate data, and/or attitude data. The wave properties include one or more of: an average wave height, a wave frequency, a wave energy, a wave power density distribution over a plurality of frequencies, an average wave power over a frequency range, and/or the Douglas sea and swell scales.

In some implementations, the system determines whether each of the one or more wave properties is within a threshold range. In response to each of the one or more wave properties being within the threshold range, the system determines that the device is safe to be deployed. In response to each of the one or more wave properties not being within the threshold range, the system determines that the device is not safe to be deployed.

In some implementations, to generate the model input data, the system performs a coordinate transformation to convert the measurement data from a Cartesian coordinate system to a spherical coordinate system. The system can further perform a time-domain to frequency-domain transformation on the measurement data in the spherical coordinate system to generate the mode input data.

In some implementations, the machine-learning model includes one or more of: a linear regression model, a linear discriminant model, a logistic regression model, a support-vector machine model, a decision tree model, a k-nearest neighbor's model, or a neural network model.

In some implementations, the system further performs training of the machine-learning model to update a plurality of model parameters of the machine-learning model. In particular, the system obtains a plurality of training examples, generate model input data for the training example based on at least the measurement data obtained at the plurality of time points, obtains corresponding label data of the wave properties for the training example, and performs training using the plurality of training examples to generate the plurality of model parameters of the machine learning model.

The subject matter described in this specification can be implemented in particular embodiments so as to realize one or more advantages.

Underwater devices, such as an underwater camera system that has been deployed in a body of water for monitoring underwater conditions, may be subject to high-intensity waves. The waves may cause damages to the underwater device or severely impact its operation. Real-time information of the wave properties of the body of water is needed for determining strategies for safe operations of the underwater device. For example, wave property parameters can be used to determine whether it is safe to deploy the underwater device to a particular position of operation.

However, real-time measurement data of the wave properties at the deployment location of the underwater device are usually not available. On the other hand, in some applications, the underwater device is already equipped with an onboard inertial-measurement unit (IMU) that provides measurement data indicating motion parameters of the underwater device in real time. This specification provides techniques for estimating the wave property parameters based on IMU measurement data. Based on the estimation of the real-time wave property parameters and a current position of the underwater device, a computer-implemented system can determine whether to move the underwater device to a new location. The techniques provided in this specification safeguard the underwater device from damages resulted from strong waves.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

An underwater device, such as an underwater camera system that has been deployed in a body of water for monitoring underwater conditions, may be subject to high-intensity tidal waves. The waves may cause damages to the underwater device or severely impact its operation. Real-time information of the wave properties of the body of water can be used for determining strategies for safe operations of the underwater device. For example, based on wave property parameters, an automated system can make decisions about whether it is safe to deploy the underwater device to a particular position of operation, and control one or more actuation systems to move the underwater device to the deployed position or a parked location according to whether it is safe to deploy the device.

A variety of wave parameters, such as the average wave height, the wave frequency, the wave energy, the wave power density distribution over a plurality of frequencies, the average wave power over a frequency range, and the Douglas sea and swell scales, can be used to describe aspects of wave properties. These wave parameters are typically measured using a surface floating device, such as a standard buoy. The movement of the buoy can be monitored and recorded using a video camera. Alternatively, the movement of the buoy can be measured using a combination of custom-designed sensors incorporated in the buoy, including multi-axis accelerometers, compass, and other sensors. The wave property parameters can be derived from the movement measurement of the buoy. However, real-time measurement data of the wave properties at the deployment location of the underwater device are usually not available.

One the other hand, in some applications, the underwater device is already equipped with an onboard inertial-measurement unit (IMU) that provides measurement data indicating motion parameters of the underwater device in real time. This specification provides techniques for estimating the wave property parameters based on IMU measurement data. In particular, the IMU measurement data used for estimating the wave properties is from an IMU onboard the underwater device. This is in contrast with conventional wave property measurement strategies that rely on measurement using surface floating devices.

Figure 1:
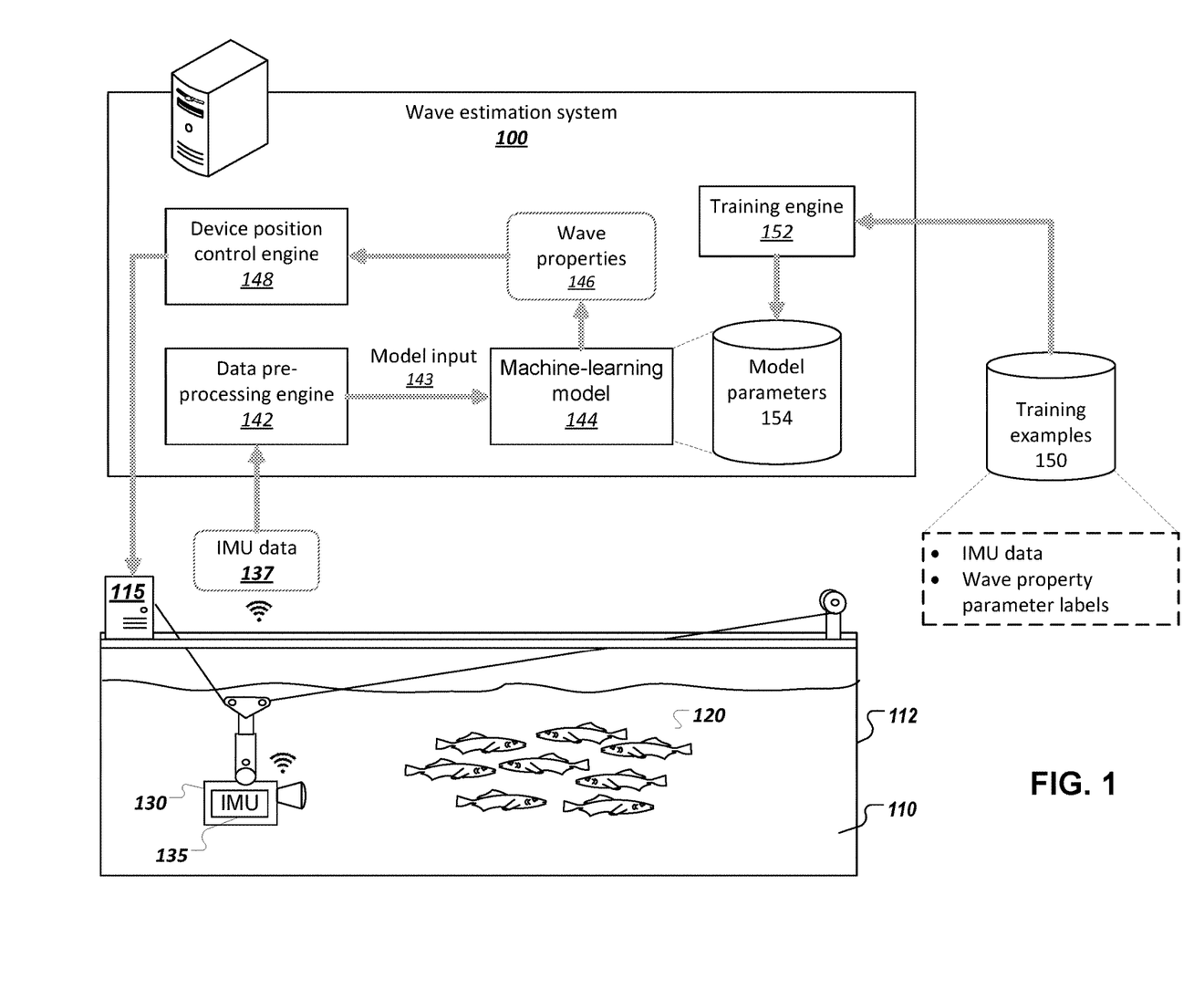
FIG. 1 shows an example wave estimation system.

FIG. 1 shows an example wave estimation system 140. System 140 is an example of a system implemented as computer programs on one or more computers in one or more locations, in which the systems, components, and techniques described below can be implemented.

In general, the wave estimation system 100 obtains IMU measurement data 137 from an IMU 135 onboard an underwater device 130 that is deployed in a body of water 110. The system 140 processes the IMU data 137 to generate output data 146 that includes wave property parameters estimated based on the IMU data 137.

In the example shown in FIG. 1, the underwater device 130 is a sensor system, e.g., an underwater camera. The device 130 is configured in an ocean aquaculture system that cultivates the growth of aquatic life, such as fish. The ocean aquaculture system includes a submerged cage structure 112 containing an underwater cargo (e.g. live fish).

In this example, the submerged cage structure 112 is an off-shore cage configured to maintain and store the aquatic cargo 120 in the open ocean and allow the cargo 120 to move freely and be monitored. In this particular example, the cage structure 112 is configured to be located in the open ocean at a desired location and allow the aquatic cargo 120, such as salmon, to move freely within the cage structure 112. The underwater device 130 includes one or more sensor devices, such as cameras, and is configured to continuously monitor the conditions of the cargo 120, such as growth, health, and feeding behaviors of the fish.

The underwater device 130 can be controlled to move within the ocean aquaculture system by a positioning system. For example, the device 130 can be supported by a bracket. The bracket is suspended by one or more cords that are attached to one or more winch systems 115 and one or more pulleys. The winch system 115 includes one or more actuation systems configured to reposition the device 130 through the cords. The actuation systems are communicatively coupled to a device position control engine 148 of the system 100 to receive commands from the device position control engine 148. The device position control engine 148 can send commands to the actuation systems for controlling the repositioning of the device 130.

The device 130 has an onboard IMU 135 that can make measurement of motion and position parameters of the device 130. The IMU 135 is communicatively coupled (e.g., via a wireless link) to the system 100 to send IMU measurement data 137. The IMU measurement data 137 has previously been used to control the positions of the device 130. In this specification, the wave estimation system 100 can further use the IMU measurement data 137 to estimate wave property parameters of the body of water 110 that the device 130 is deployed within.

The system 100 can receive the IMU measurement data 137 continuously, on a schedule, or when triggered by a command. The IMU measurement data 137 can include linear acceleration data and angular rate data measured for a duration of time, and indicate one or more positional and movement parameters of the underwater device 130 including attitude, angular rates, linear velocity, linear acceleration, and/or position relative to a global reference frame.

In an example implementation, a microcontroller of the system 100 reads the IMU data at a specified (e.g., 10 Hz) polling rate. The system 100 stores the time-domain discretized IMU data (including one or more measured parameters) into a circular buffer. A data-pre-processing engine 142 of the system 100 performs pre-processing of the stored IMU data, including, e.g., calibration and filtering, using an onboard processor or via a remote procedure call (RPC), e.g., from the embedded software running on a remote module.

The data pre-processing engine 142 can further process the measurement data to generate model input data 143 for subsequent processing. In particular, data pre-processing engine 142 can transform the measurement data from a Cartesian coordinate system to a spherical coordinate system, and further transform the measurement data from the time domain to the frequency domain.

In some implementations, the measurement data obtained from the IMU is in the Cartesian coordinate. For example, the acceleration parameter a received from the IMU can include components along the x, y, and z axis including components $a_x$, $a_y$, and $a_z$. Before further processing, the data pre-processing engine 142 can convert the IMU measurement data from the Cartesian coordinate into the spherical coordinate, e.g., by converting $a_x$, $a_y$, and $a_z$ into $a_r$ (radial component), $a_\theta$ (azimuthal component), and $a_\varphi$ (zenith component) by performing the coordinate transformation.

In some implementations, the data pre-processing engine 142 can perform domain transformation to transform the IMU measurement data from the time domain to another domain. For example, the system can perform a fast Fourier transform (FFT) to transform $a_r$, $a_\theta$, and $a_\varphi$ into the frequency domain.

The data pre-processing engine 142 can transform the IMU measurement data 137 including one or more movement or positional parameters from time-domain data in the Cartesian coordinate into frequency-domain data in the spherical coordinate. These transformed parameters can form a model input for subsequent processing.

The system 100 uses a machine-learning model 144 to process the model input data 143 to generate estimations of one or more wave property parameters 146.

The machine-learning model 144 is a model configured to receive the input data 143, and perform computations on the input data 143 to generate an output that includes the estimations of the one or more wave property parameters 146. The machine-learning model 144 can include one or more of: a linear regression model, a linear discriminant model, a logistic regression model, a support-vector machine model, a decision tree model, a k-nearest neighbors model, and/or a neural network model. In general, the machine-learning model 144 has a plurality of model parameters 154 which can be learned by performing training using a plurality of training examples.

The output of the machine-learning model can include estimations of one or more wave property parameters 146, including, for example, an average wave height, a wave frequency, a wave energy, a wave power density distribution over a plurality of frequencies, an average wave power over a frequency range, and the Douglas sea and swell scales. One or more of these parameters can be predicted by the machine-learning model based on the model input data 143.

In some implementations, the model output data further includes an estimate of a depth of the current position of the device 130.

The system 100 further includes a device position control engine 148 configured to determine whether the underwater device 130 is safe to be deployed. In particular, the device position control engine 148 can determine whether the underwater device 130 can be safely deployed based on at least the estimations of the one or more wave property parameters 146. For example, when very strong ocean waves are present at the location at the underwater device 130, the ocean wave may damage the underwater device 130 in a deployed position. For example, the strong ocean waves can substantially move the underwater device 130 in a bobbing fashion, and when the underwater device 130 is deployed at a location not far enough from the cage structure 112, the underwater device 130 can collide with the cage structure 112, resulting in device damages and malfunctions.

In some implementations, the device position control engine 148 can first determine whether each of the one or more wave properties is within a threshold range. For example, the device position control engine 148 can determine whether the estimated wave height is below a threshold height and whether the estimated average wave power over a frequency range is below a threshold power. If each wave property parameter outputted by the machine-learning model is within the threshold range, e.g., the estimated wave height is below the threshold height and the estimated average wave power is below the threshold power, the device position control engine 148 can determine that the device is safe to be deployed. On the other hand, if one or more of the wave property parameters outputted by the machine-learning model are not within the threshold range, e.g., the estimated wave height is above the threshold height or the estimated average wave power is above the threshold power, the device position control engine 148 can determine that the device is not safe to be deployed.

The device position control engine 148 can further determine whether to move the device 130 to a new position. In particular, the device position control engine 148 can determine, based on a current position of the device 130 and whether the device is safe to be deployed, whether to move the device 130 to a new position.

In some implementations, if it has been determined that that the device 130 is safe to be deployed and the device 130 is in a parked position, the device position control engine 148 determines to move the device 130 to a deployed position, and sends commands to the actuation systems of the winch system 115 to move the underwater device 130 to the new position. If it has been determined that that the device 130 is safe to be deployed and the device 130 is already in a deployed position, the device position control engine 148 can determine to keep the device in the current (deployed) position. Here, the parked position is a safe region for the device 130. For example, the parked position is a position within a central region of the cage structure 112. The device 130 is protected from colliding in the cage structure 112 when it is at the parked position. The deployed position can be a position outside the central region. The device 130 is only safe to be at the deployed position when the estimation of the wave property parameters are within a safe range.

If the device position control engine 148 has determined that the device 130 is not safe to be deployed and the device 130 is in a deployed position, the device position control engine 148 can determine to move the device to a parked position, and sends commands to the actuation systems of the winch system 115 to move the underwater device 130 to the new position. If the device position control engine 148 has determined that the device 130 is not safe to be deployed and the device 130 is in the parked position, the device position control engine 148 can determine to keep the device in the current (parked) position.

In some implementations, the system 100 further includes a training engine 152 that performs training of the machine-learning model 144. The training engine 152 performs training of the machine-learning model 144 to update the plurality of parameters 154 of the model based on a plurality of training examples 150. Each training example 150 can include model input data obtained based on IMU measurement data and label data including the wave property parameter labels. For example, to obtain a training example, the system 100 can obtain IMU measurement data a plurality of time points from the IMU 135 onboard the device 130, while simultaneously recording corresponding label data of the wave properties, e.g., by using benchmarking measurements. In one example, the system 100 can generate benchmarking measurements of the wave heights based on video images (captured by another camera) of the surface of the water. In another example, the system 100 can generate benchmarking data for some of the other wave property parameters using a surface floating device, such as a standard buoy incorporated with customized measurement devices.

Once data for a plurality of training examples 150 have been collected, the training engine 152 can use the training example 150 to update the model parameters 154 of the machine-learning model 144 using any appropriate algorithms. For example, when the machine-learning model 144 is a neural network, the training engine 152 can update the model parameters (e.g., weight and bias coefficients) of the neural network based on a loss function computed on the training examples 150 using any appropriate backpropagation-based machine-learning technique, e.g., using the Adam or AdaGrad algorithms.

Figure 2A:
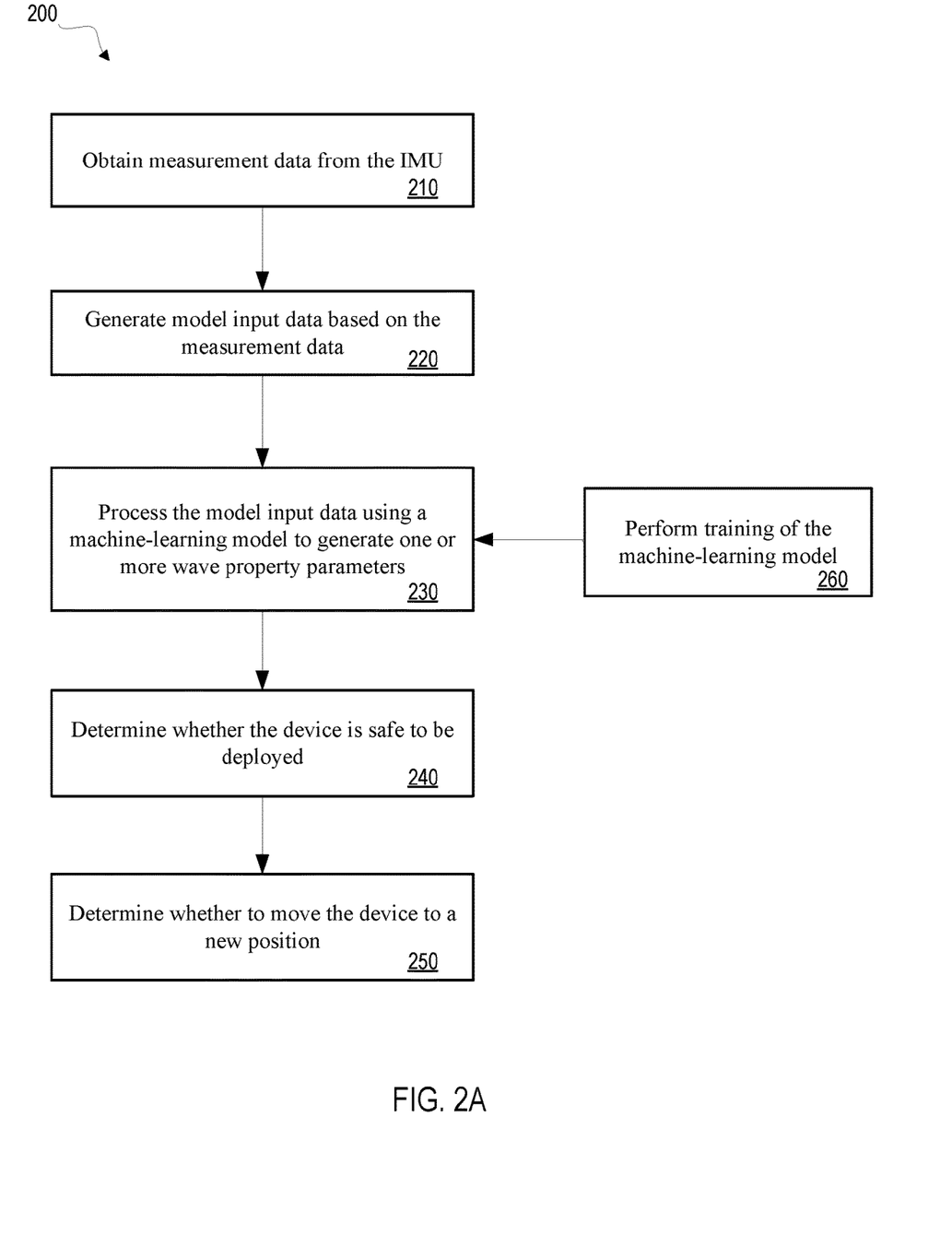
FIG. 2A is a flow diagram of an example process of characterizing wave properties.

FIG. 2A shows a wave estimation process 200. For convenience, the process illustrated in FIG. 2A will be described as being performed by a system of one or more computers located in one or more locations. For example, the wave estimation system 140 of FIG. 1, appropriately programmed in accordance with this specification, can perform the process. The process 200 can include the following operations.

In operation 210, the system obtains measurement data from an inertial measurement unit (IMU). The IMU is onboard an underwater device, e.g., an underwater camera system that has been deployed in a body of water for monitoring underwater conditions. The measurement data can include linear acceleration data and angular rate data measured for a duration of time, and indicate one or more positional and movement parameters of the underwater device including attitude, angular rates, linear velocity, linear acceleration, and/or position relative to a global reference frame.

In an example implementation, a microcontroller of the system reads the IMU data at a specified (e.g., 10 Hz) polling rate. The system stores the time-domain discretized IMU data (including one or more measured parameters) into a circular buffer. The system performs pre-processing of the stored IMU data, including, e.g., calibration and filtering, using an onboard processor or via a remote procedure call (RPC), e.g., from the embedded software running on a remote module.

Figure 2B:
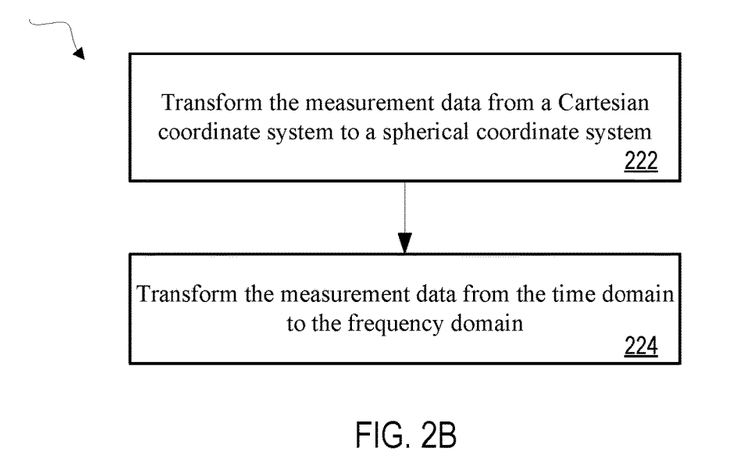
FIG. 2B is a flow diagram of an example process of generating model input data based on measurement data.

In operation 220, the system generates model input data based on the measurement data. In some implementations, the system further processes the IMU measurement data to generate data for subsequent processing using a machine learning model. In particular, an example of steps in performing the operation 220 will be discussed below with reference to FIG. 2B. As shown in FIG. 2B, the operation 220 can include the following steps.

In step 222, the system transforms the measurement data from a Cartesian coordinate system to a spherical coordinate system.

In some implementations, the measurement data obtained from the IMU is in the Cartesian coordinate. For example, the acceleration parameter a received from the IMU can include components along the x, y, and z axis including $a_x$, $a_y$, and $a_z$. Before further processing, the system can convert the IMU measurement data from the Cartesian coordinate into the spherical coordinate, e.g., convert $a_x$, $a_y$, and $a_z$ into $a_r$ (radial component), $a_\theta$ (azimuthal component), and $a_\varphi$ (zenith component) by performing coordinate transformation.

In step 224, the system transforms the measurement data from the time domain to the frequency domain.

In some implementations, the system can perform domain transformation to transform the IMU measurement data from the time domain to another domain. For example, the system can perform a fast Fourier transform (FFT) to transform $a_r$, $a_\theta$, and $a_\varphi$ into the frequency domain.

The system can transform the IMU measurement data including one or more movement or positional parameters from time-domain data in the Cartesian coordinate into frequency-domain data in the spherical coordinate. These transformed parameters can form a model input for subsequent processing.

Referring back to FIG. 2A for the wave estimation process 200, in operation 230, the system processes the input data using a machine-learning model to generate one or more wave property parameters.

The machine-learning model is a model configured to receive the input data, and perform computations on the input data to generate an output that includes the one or more wave property parameters. The machine-learning model can include one or more of: a linear regression model, a linear discriminant model, a logistic regression model, a support-vector machine model, a decision tree model, a k-nearest neighbors model, and/or a neural network model. In general, the machine-learning model has a plurality of model parameters which can be learned by performing training using a plurality of training examples.

The output of the machine-learning model can include estimations of one or more wave property parameters, including, for example, an average wave height, a wave frequency, a wave energy, a wave power density distribution over a plurality of frequencies, an average wave power over a frequency range, and the Douglas sea and swell scales. One or more of these parameters can be predicted by the machine-learning model based on the model input data.

In some implementations, the model output data further includes an estimate of a depth of the current position of the device.

In operation 240, the system determines whether the device is safe to be deployed. In particular, the system can determine whether the device, e.g., the underwater camera system, can be safely deployed based on at least the one or more wave properties.

In some implementations, the system can first determine whether each of the one or more wave properties is within a threshold range. For example, the system can determine whether the estimated wave height is below a threshold height and whether the estimated average wave power over a frequency range is below a threshold power. If each wave property parameter outputted by the machine-learning model is within the threshold range, e.g., the estimated wave height is below the threshold height and the estimated average wave power is below the threshold power, the system can determine that the device is safe to be deployed. On the other hand, if one or more of the wave property parameters outputted by the machine-learning model are not within the threshold ranges, e.g., the estimated wave height is above the threshold height or the estimated average wave power is above the threshold power, the system can determine that the device is not safe to be deployed.

Figure 2C:
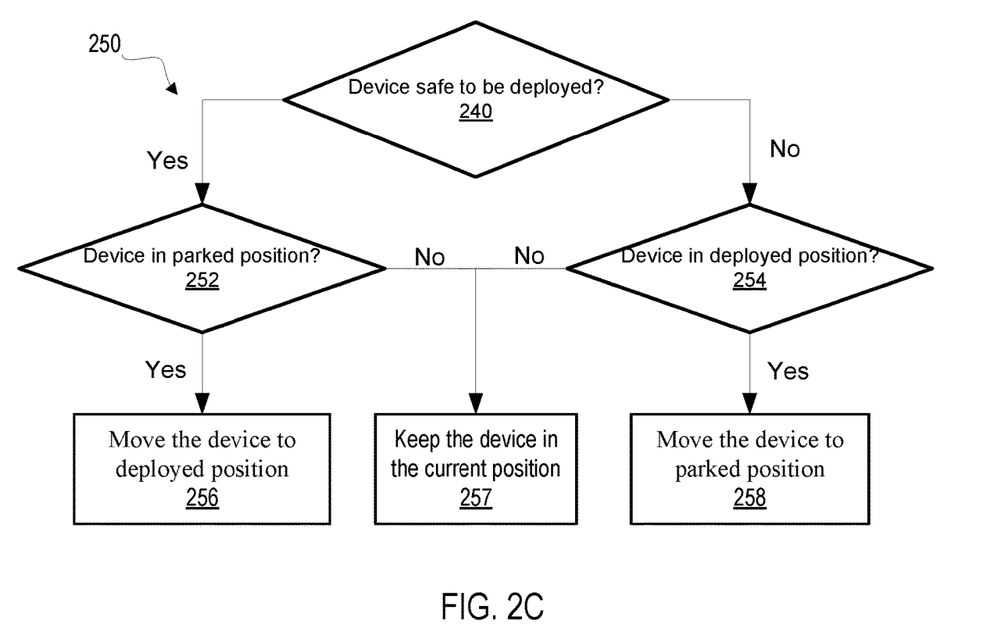
FIG. 2C is a flow diagram of an example process of determining whether to move a device to a new position.

In operation 250, the system determines whether to move the device to a new position. In particular, the system can determine, based on a current position of the device and whether the device is safe to be deployed, whether to move the device to a new position. An example of steps in performing the operation 250 will be discussed below with reference to FIG. 2C. As shown in FIG. 2C, the operation 250 can include the following steps.

If the system determines that the device is safe to be deployed in operation 240, the system performs step 252 to determine if the device is in a parked position. If yes, the system determines to move the device to a deployed position in step 256. If no, the system determines to keep the device in the current (deployed) position in step 257.

If the system determines that the device is not safe to be deployed in operation 240, the system performs step 254 to determine if the device is in a deployed position. If yes, the system determines to move the device to a parked position in step 258. If no, the system determines to keep the device in the current (parked) position in step 257.

In one example, the device is a sensor system (e.g., a camera) configured in an underwater cage structure to collect data of an aquatic cargo. The parked position is a position within a central region of the cage structure, and the deployed position is a position outside the central region. The sensor system can be supported by a support bracket that is connected to one or more actuation systems respectively through one or more cords. In response to the system determining to move the device to the new position, the system can control the one or more actuation systems to move the device.

Referring back to FIG. 2A, in some implementations, the process 200 further includes, in operation 260, performing training of the machine-learning model. Concretely, the system performs training of the machine-learning model to update the plurality of parameters of the model based on a plurality of training examples. For each of the plurality of training examples, the system can obtain measurement data for the training example at a plurality of time points from the IMU onboard the device, generate model input data for the training example based on the measurement data obtained at the plurality of time points; and obtains corresponding label data of the wave properties for the training example, e.g., by using benchmarking measurements. In one example, the system can generate benchmarking measurements of the wave heights based on video images (captured by another camera) of the surface of the water. In another example, the system can generate benchmarking data for some of the other wave property parameters using a surface floating device, such as a standard buoy incorporated with customized measurement devices. The benchmarking measurements for generating the label data are obtained while the system receives the IMU measurement data for generating the model input data.

Figure 3:
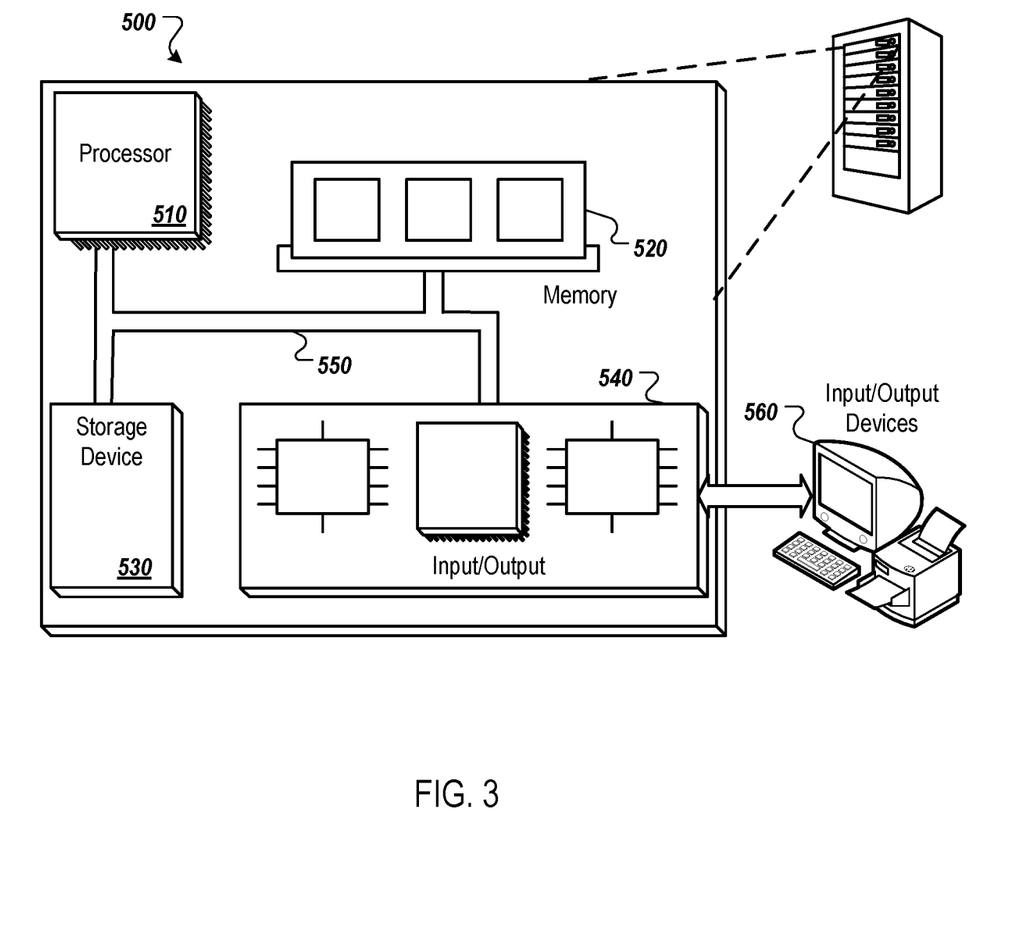
FIG. 3 shows an example computer system for implementing the wave estimation system.

FIG. 3 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (for example, a cloud storage device), or some other large capacity storage device.

The input/output device 540 provides input/output operations for the system 500. In one implementation, the input/output device 540 can include one or more network interface devices, for example, an Ethernet card, a serial communication device, for example, a RS-232 port, and/or a wireless interface device, for example, a 502.11 card. In another implementation, the input/output device can include driver devices configured to receive input data and send output data to other input/output devices, for example, keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claim is:

1. A computer-implemented method comprising:
   obtaining, by an underwater camera device, inertial measurement unit (IMU) data that reflects motion of the underwater camera device over a period of time;
   generating, by the underwater camera device, particular model input data based at least on the IMU data;
   providing, by the underwater camera device, the particular model input data to a machine learning model that is trained to output estimated wave properties based on model input data;
   receiving, by the underwater camera device, a particular estimated wave property; and
   determining, by the underwater camera device, a future device position for the underwater camera device after receiving the particular estimated wave property.

2. The method of claim 1, wherein generating the particular model input data comprises transforming movement or positional parameters of the IMU data from time-domain data to frequency-domain data.

3. The method of claim 1, wherein determining a future position for the underwater camera device comprises determining to move to a stowed position for the underwater camera device.

4. The method of claim 1, wherein the particular estimated wave property comprises an estimated value on a Douglas sea scale.

5. The method of claim 1, wherein determining a future device position comprises determining to move to a predetermined distance from a cage structure.

6. The method of claim 1, wherein determining a future device position comprises determining to move to a center of a cage structure.

7. The method of claim 1, wherein determining a future device position comprises determining that the particular estimated wave property satisfies a threshold.

8. A system comprising:
   one or more computers; and
   one or more storage devices storing instructions that, when executed by the one or more computers, cause the one or more computers to perform operations comprising:
   obtaining, by an underwater camera device, inertial measurement unit (IMU) data that reflects motion of the underwater camera device over a period of time;
   generating, by the underwater camera device, particular model input data based at least on the IMU data;
   providing, by the underwater camera device, the particular model input data to a machine learning model that is trained to output estimated wave properties based on model input data;
   receiving, by the underwater camera device, a particular estimated wave property; and
   determining, by the underwater camera device, a future device position for the underwater camera device after receiving the particular estimated wave property.

9. The system of claim 8, wherein generating the particular model input data comprises transforming movement or positional parameters of the IMU data from time-domain data to frequency-domain data.

10. The system of claim 8, wherein determining a future position for the underwater camera device comprises determining to move to a stowed position for the underwater camera device.

11. The system of claim 8, wherein the particular estimated wave property comprises an estimated value on a Douglas sea scale.

12. The system of claim 8, wherein determining a future device position comprises determining to move to a predetermined distance from a cage structure.

13. The system of claim 8, wherein determining a future device position comprises determining to move to a center of a cage structure.

14. The system of claim 8, wherein determining a future device position comprises determining that the particular estimated wave property satisfies a threshold.

15. A non-transitory computer-readable storage medium that stores instructions that, when executed by one or more computers, cause the one or more computers to perform operations comprising:
   obtaining, by an underwater camera device, inertial measurement unit (IMU) data that reflects motion of the underwater camera device over a period of time;
   generating, by the underwater camera device, particular model input data based at least on the IMU data;
   providing, by the underwater camera device, the particular model input data to a machine learning model that is trained to output estimated wave properties based on model input data;
   receiving, by the underwater camera device, a particular estimated wave property; and
   determining, by the underwater camera device, a future device position for the underwater camera device after receiving the particular estimated wave property.

16. The medium of claim 15, wherein generating the particular model input data comprises transforming movement or positional parameters of the IMU data from time-domain data to frequency-domain data.

17. The medium of claim 15, wherein determining a future position for the underwater camera device comprises determining to move to a stowed position for the underwater camera device.

18. The medium of claim 15, wherein the particular estimated wave property comprises an estimated value on a Douglas sea scale.

19. The medium of claim 15, wherein determining a future device position comprises determining to move to a predetermined distance from a cage structure.

20. The medium of claim 15, wherein determining a future device position comprises determining to move to a center of a cage structure.

* * * * *

UNITED STATES PATENT AND TRADEMARK OFFICE
CERTIFICATE OF CORRECTION

| | |
|---|---|
| PATENT NO. | : 12,228,642 B2 |
| APPLICATION NO. | : 18/363506 |
| DATED | : February 18, 2025 |
| INVENTOR(S) | : Thomas Robert Swanson and Riva Gulassa |

Page 1 of 1

It is certified that error appears in the above-identified patent and that said Letters Patent is hereby corrected as shown below:

On the Title Page

Column 1, (73) Assignee:
Delete "TidalX" and insert -- TidalX --.

Signed and Sealed this
Seventh Day of October, 2025

John A. Squires
*Director of the United States Patent and Trademark Office*